(12) United States Patent
Denison

(10) Patent No.: US 12,145,064 B2
(45) Date of Patent: Nov. 19, 2024

(54) USING DATA FROM A GAME METADATA SYSTEM TO CREATE ACTIONABLE IN-GAME DECISIONS

(71) Applicant: Sony Interactive Entertainment Inc., Tokyo (JP)

(72) Inventor: Charles Denison, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 104 days.

(21) Appl. No.: 17/472,650

(22) Filed: Sep. 12, 2021

(65) Prior Publication Data

US 2023/0082732 A1    Mar. 16, 2023

(51) Int. Cl.
| | |
|---|---|
| *A63F 13/533* | (2014.01) |
| *A63F 13/67* | (2014.01) |
| *A63F 13/79* | (2014.01) |
| *A63F 13/822* | (2014.01) |
| *G06N 20/00* | (2019.01) |

(52) U.S. Cl.
CPC ............ *A63F 13/533* (2014.09); *A63F 13/67* (2014.09); *A63F 13/79* (2014.09); *A63F 13/822* (2014.09); *G06N 20/00* (2019.01)

(58) Field of Classification Search
None
See application file for complete search history.

(56) References Cited

U.S. PATENT DOCUMENTS

| | | | |
|---|---|---|---|
| 10,576,380 B1* | 3/2020 | Beltran | ............... A63F 13/67 |
| 2007/0260567 A1* | 11/2007 | Funge | ............... A63F 13/67 |
| | | | 706/47 |
| 2008/0097948 A1 | 4/2008 | Funge et al. | |
| 2009/0054123 A1 | 2/2009 | Mityagin et al. | |
| 2009/0094535 A1* | 4/2009 | Bromenshenkel | ...... A63F 13/67 |
| | | | 715/757 |
| 2011/0302117 A1 | 12/2011 | Pinckney et al. | |
| 2013/0143669 A1 | 6/2013 | Muller | |
| 2014/0256438 A1* | 9/2014 | Grant | ..................... G06F 3/016 |
| | | | 463/36 |
| 2015/0375101 A1* | 12/2015 | George | ................. A63F 13/497 |
| | | | 463/24 |

(Continued)

OTHER PUBLICATIONS

"Inernational Search Report and Written Opinion", dated Jan. 30, 2023, from the counterpart PCT application PCT/US22/76258.

(Continued)

*Primary Examiner* — Jason T Yen
(74) *Attorney, Agent, or Firm* — John L. Rogitz; John M. Rogitz

(57) ABSTRACT

A machine learning (ML) model is used to identify successful outcomes in computer games based on aggregated game metadata including activity, mechanics, actors, statistics, and zones or locations. A strategy includes how a player over time used a character (actor) to employ one or more mechanics (weapons, vehicles) to execute various activities in various zones or locations in a computer game, with strategies being graded for success. Good strategies are then surfaced to subsequent players by, e.g., advising a player to seek a better location in a game, employ a different mechanic based on the game zone the player's character is in such as employ a different car or car configurations, employ a plane, a particular weapon, etc.

20 Claims, 7 Drawing Sheets

(56) References Cited

U.S. PATENT DOCUMENTS

| | | | |
|---|---|---|---|
| 2016/0005270 A1 | 1/2016 | Marr et al. | |
| 2017/0021274 A1* | 1/2017 | Vonderhaar | A63F 13/795 |
| 2017/0302611 A1* | 10/2017 | Mizuki | G06Q 50/01 |
| 2018/0280802 A1* | 10/2018 | Stroud | A63F 13/63 |
| 2019/0272560 A1* | 9/2019 | Shin | G06N 3/08 |
| 2019/0329139 A1* | 10/2019 | Di Giacomo Toledo | A63F 13/67 |
| 2019/0347956 A1* | 11/2019 | Daga | G16H 40/67 |
| 2019/0388785 A1* | 12/2019 | Kumar | G10L 15/1815 |
| 2020/0061478 A1* | 2/2020 | Kopf | G07F 17/326 |
| 2020/0122043 A1* | 4/2020 | Benedetto | A63F 13/85 |
| 2020/0215414 A1 | 7/2020 | Morton et al. | |
| 2020/0269136 A1* | 8/2020 | Gurumurthy | G06N 3/08 |
| 2020/0324206 A1* | 10/2020 | Yilmazcoban | G06N 3/044 |
| 2020/0388178 A1* | 12/2020 | Barbuto | A61B 5/165 |
| 2020/0398166 A1* | 12/2020 | Kwon | A63F 13/79 |
| 2021/0069592 A1* | 3/2021 | Noss | A63F 13/67 |
| 2021/0245061 A1* | 8/2021 | Kaushik | A63F 13/5375 |
| 2021/0268377 A1* | 9/2021 | Hamaguchi | A63F 13/5252 |
| 2022/0129627 A1 | 4/2022 | Tiwari et al. | |
| 2022/0230632 A1 | 7/2022 | Maitra et al. | |

OTHER PUBLICATIONS

Denison, Charles, "Method of Using ML and AI to Generate Codex Content", file history of related U.S. Appl. No. 18/180,780, filed Mar. 8, 2023.

* cited by examiner

USING DATA FROM A GAME METADATA SYSTEM TO CREATE ACTIONABLE IN-GAME DECISIONS

FIELD

The present application relates generally to techniques for using data from a computer game metadata system to create actionable in-game decisions.

BACKGROUND

Stored computer game data may be maintained by a computer simulation system such as a computer game network.

SUMMARY

As understood herein, in some applications, for example, computer simulations such as computer games, such stored computer game data may be leveraged to provide advice on game strategy to players.

Accordingly, a system includes at least one computer medium that is not a transitory signal and that in turn instructions executable by at least one processor to train at least a first machine learning (ML) model on plural computer game strategies, at least some of which may include at least one computer game character executing at least one activity using at least one mechanic in at least one computer game location. At least some of the strategies are associated with ground truth outcomes. The instructions are executable to, subsequent to training, input to the ML model a current game information, and use the ML model to output an advisory to a player of a computer game generating the current game information regarding changing one or more of a computer game character, a mechanic, a location, an activity. If desired, the instructions can be executable to arrange game play historical data in a database according to object types employed in respective computer games, with the object types including computer game characters, computer game activities, computer game mechanics, computer game locations.

In another aspect, a method includes receiving computer simulation play data from plural computer simulation assemblies. The method also includes storing the simulation play data in a database arranged by object types. The object types include simulation locations, simulation characters, simulation activities, simulation mechanics, and simulation statistics. The method includes accessing the database to return one or more advisories to a player of a current simulation.

In another aspect, an assembly includes at least one display device (DD), at least one computer simulation controller (CSC) configured to control at least one computer simulation presented on the DD, and at least one processor programmed to send, to a network server system, information regarding strategy employed during play of a computer game under control of the CSC. The processor is programmed to receive from the network server system a recommendation of an alternate strategy to be employed in playing the computer game, and to present the recommendation on the display.

The details of the present application, both as to its structure and operation, can be best understood in reference to the accompanying drawings, in which like reference numerals refer to like parts, and in which:

and

Figure 12:
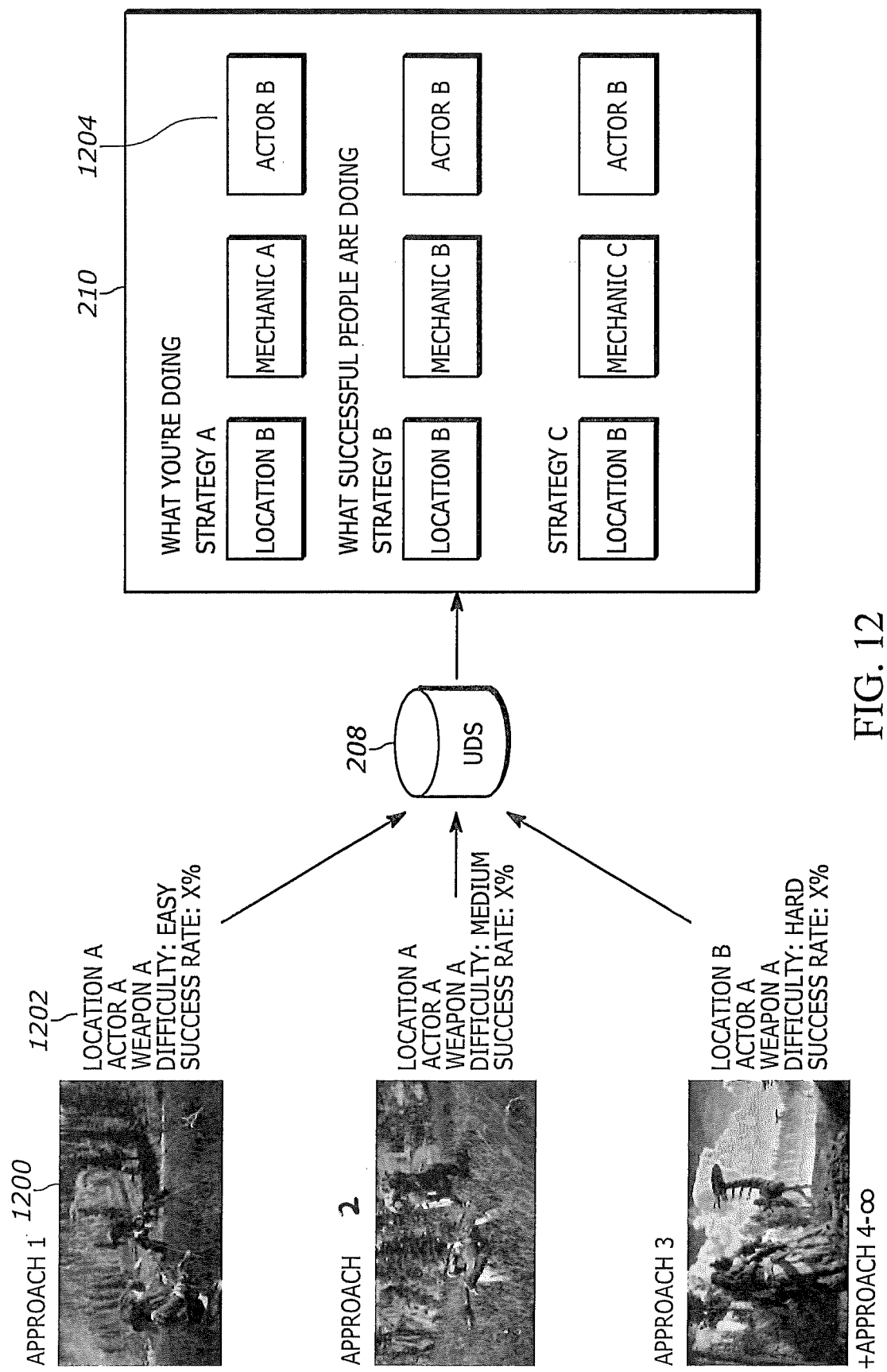

FIG. 12 illustrates data flow consistent with present principles.

DETAILED DESCRIPTION

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Figure 1:
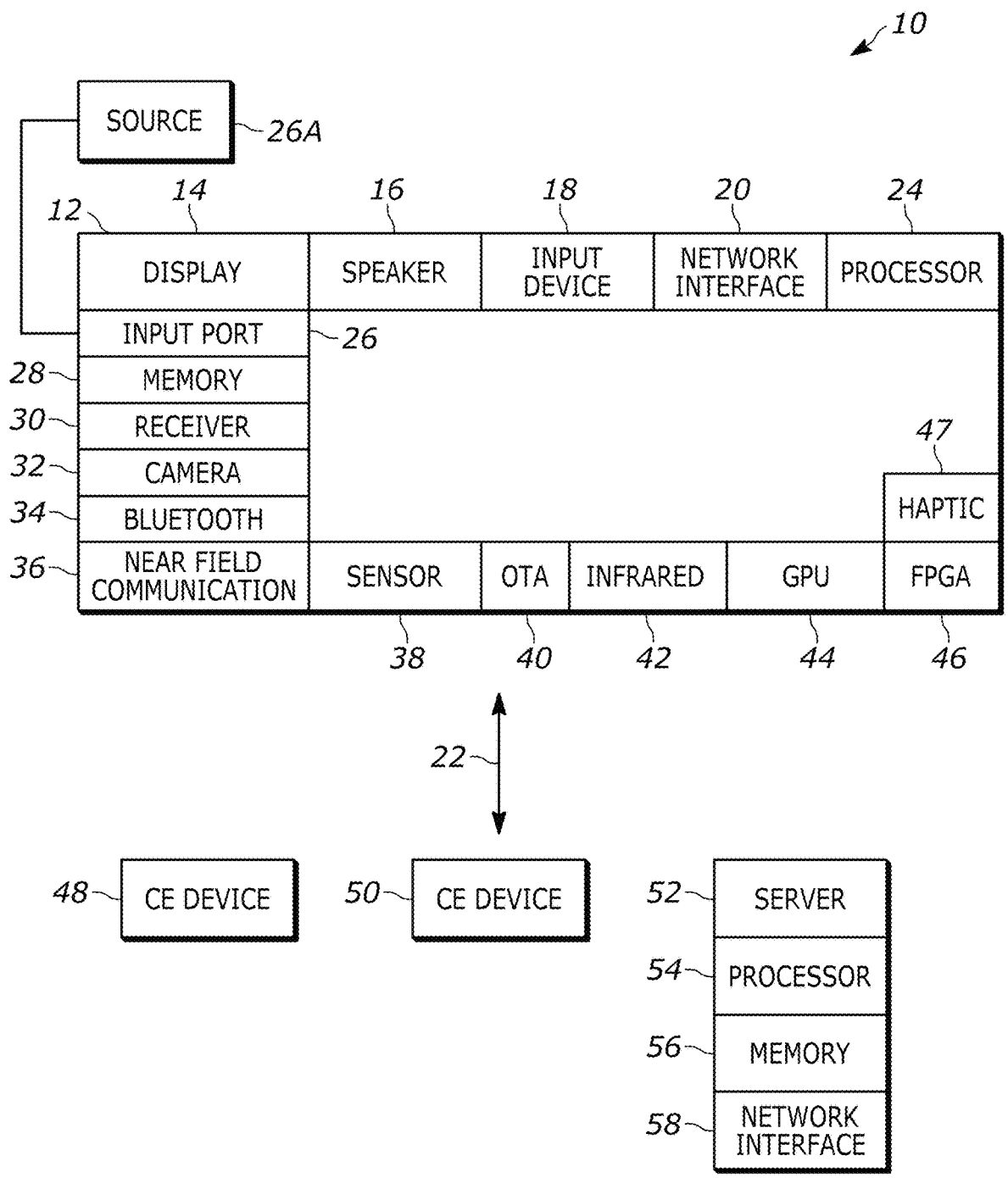
FIG. 1 is a block diagram of an example system including an example in accordance with present principles.

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
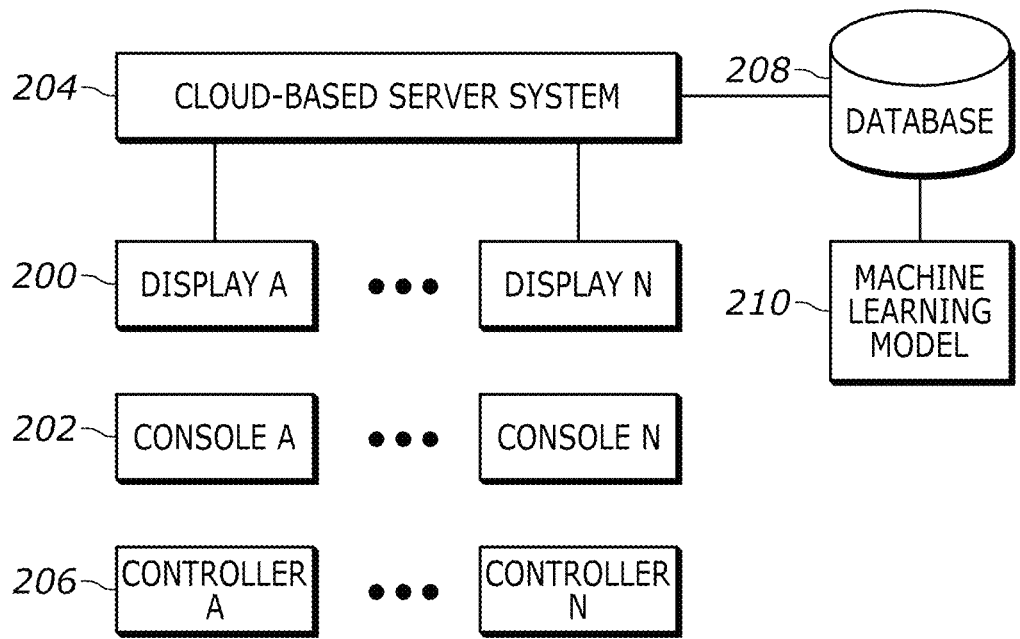
FIG. 2 is a block diagram of a computer simulation system such as a computer game system.

FIG. 2 illustrates an example computer simulation system such as a distributed computer game system in which player displays 200 may present computer simulations such as computer games sourced from respective computer simulation consoles 202 and/or a cloud-based server source 204 of computer games under control of computer game controllers 206. The cloud-based server system 204 may access a database 208 of computer game metadata to provide game data thereto, with a machine learning (ML) model 210 accessing the database 208 for purposes to be shortly disclosed.

Figure 3:
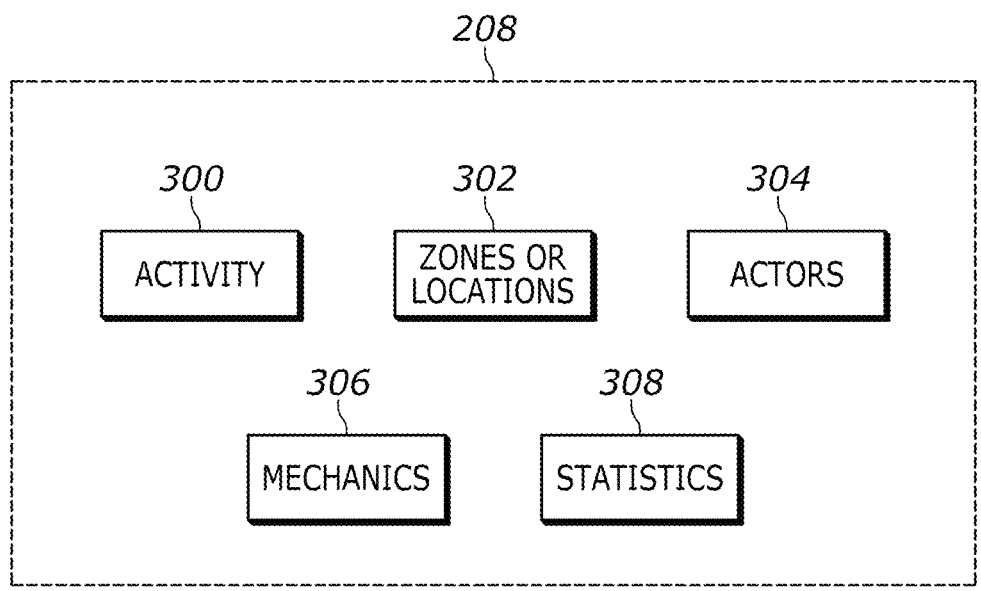
FIG. 3 is a block diagram of the game metadata database.

FIG. 3 illustrates that the metadata in the database 208 may be arranged in five object types. A first object type may be activity 300, i.e., the activity of a player's character(s) over time in moving through the game world and executing tasks. A location object type 302 may represent locations in computer games in which activities 300 take place. An actor object type 304 may represent computer game characters who undertake the activities 300 in the locations 302. A mechanics object type 306 represents mechanics used by the actors/characters and can include weapon types, vehicle types including waterborne and airborne vehicle types including custom equipment by type, and other implements that a computer game character might avail itself of.

Also, a statistics object type 308 may represent statistics as to the outcomes of characters operating mechanics in various zones or locations to execute certain activities. Such statistics may include, e.g., boss kills, survival time, highest game level attained, other goals met, total enemies killed, how quickly the character died, missed shots, etc.

Figure 4:
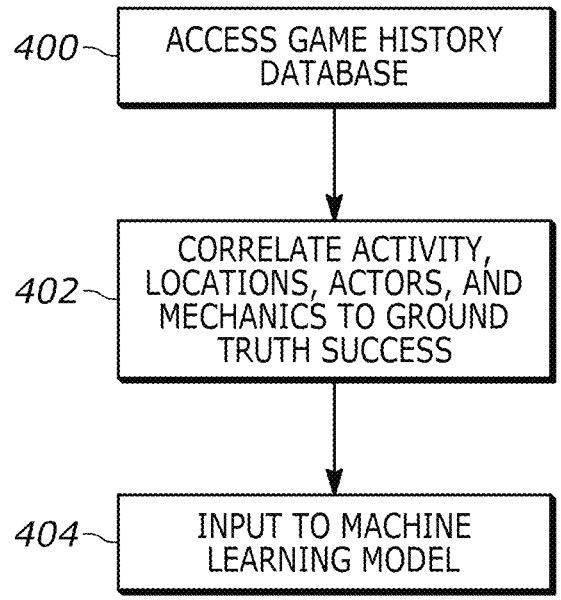
FIG. 4 illustrates training a machine learning (ML) model consistent with present principles.

FIG. 4 illustrates that at block 400, the ML model 210 shown in FIG. 2 may be trained by accessing the metadata database 208 and retrieving strategies of prior players and/or strategies input by experts as representing optimum strategies. These strategies are established by activities over time of particular game characters wielding particular mechanics in particular game locations, along with the ground truth outcomes of those strategies, good or bad, correlated at block 402. Such information may include feature vectors. The training set is input at block 404 to the ML model 210 to train the model.

One or more support vector machines (SVM), Decision Trees, and/or neural networks such as but not limited one or more convolutional neural networks (CNN) may be used to implement the ML model 210.

Figure 5:
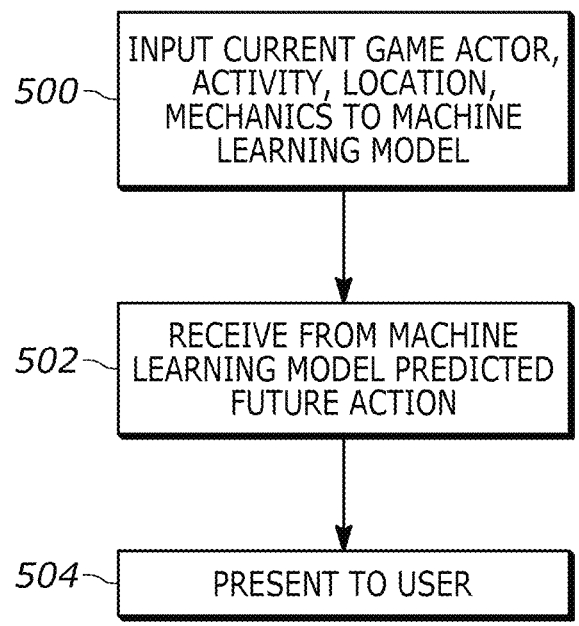
FIG. 5 illustrates using a machine learning (ML) model consistent with present principles to provide advice to a player of a computer game.

In operation, at block 500 in FIG. 5 a current game activity of a game character including mechanics wielded by the character and game locations occupied by the character are input to the ML model. This information may be classified into feature vectors if desired prior to input to the model.

Moving to block 502, based on its training the ML model outputs predicted future activity that the player might take to improve or optimize the player's performance, which can be presented to the player at block 504 visibly, audibly, tactilely, and combinations thereof. Note that this predicted future activity can amount to a recommendation of a different strategy (discussed further below) for a player to use and may be presented based on a difficulty level set by the player, such that, for instance, a lower difficulty level can result in presenting a recommended new strategy more often or earlier in a game than a higher difficulty level.

Figure 6:
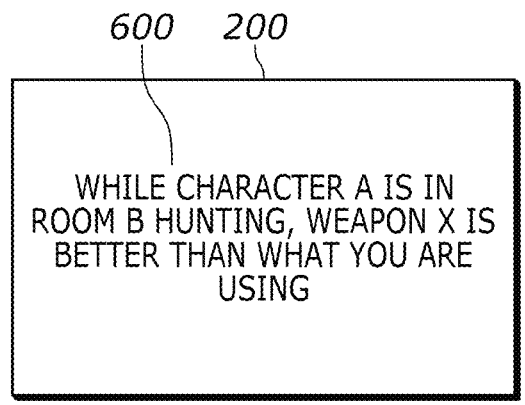
FIGS. 6 and 6A illustrate example user interfaces (UI) consistent with present principles.
Figure 6A:
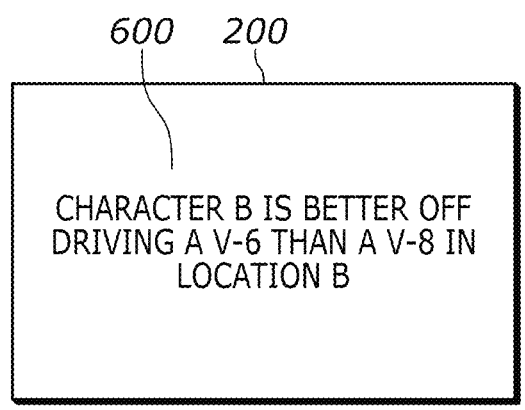

Example future activity can include advice to use a different character, change mechanics wielded by the character, move the character to a different game location, try a different activity, e.g., fly instead of fight. FIGS. 6 and 6A provide non-limiting illustrations at 600 in which the player is advised that while in a particular location, room B, executing a particular activity, e.g., hunting, a particular mechanic, e.g., weapon X, is better than the weapon currently being used by the character. In FIG. 6A advice at 602 indicates that a particular character (B) is better off with a different mechanic in the particular location the character is in, in the example shown, a V-6 model of the vehicle rather than a V-8.

Figure 7:
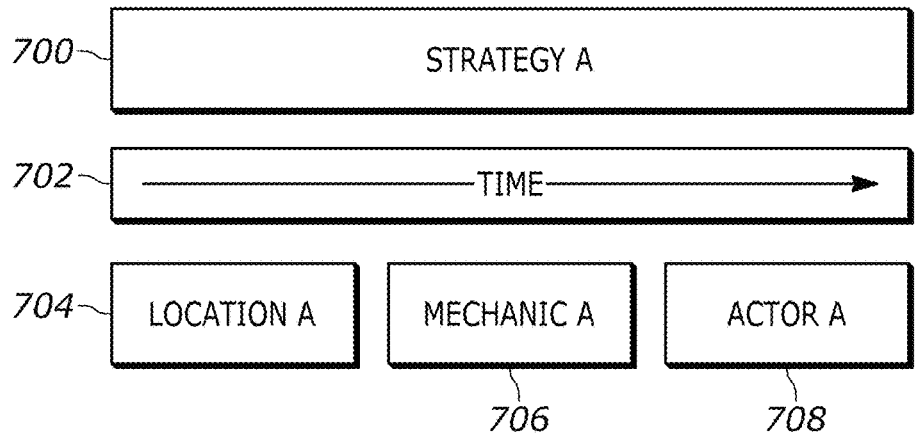
FIGS. 7-11 illustrate example game strategies consistent with present principles.
Figure 8:
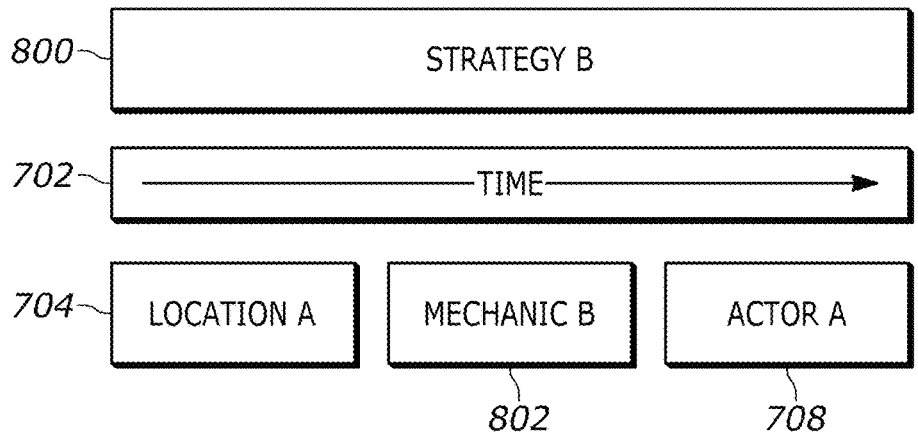

FIGS. 7-11 illustrate various game play strategies as represented by the organization of data objects in the database 208 over time. A first strategy 700 is shown in FIG. 7 in which a time axis 702 may represent activity a player undertook at a first location 704, using a first mechanic 706, in the possession of a first actor or game character 708. In contrast, in FIG. 8 a second strategy 800 may include activity in the same location 704 as the first strategy with the same actor or character 708 but with a different, second mechanic 802.

Figure 9:
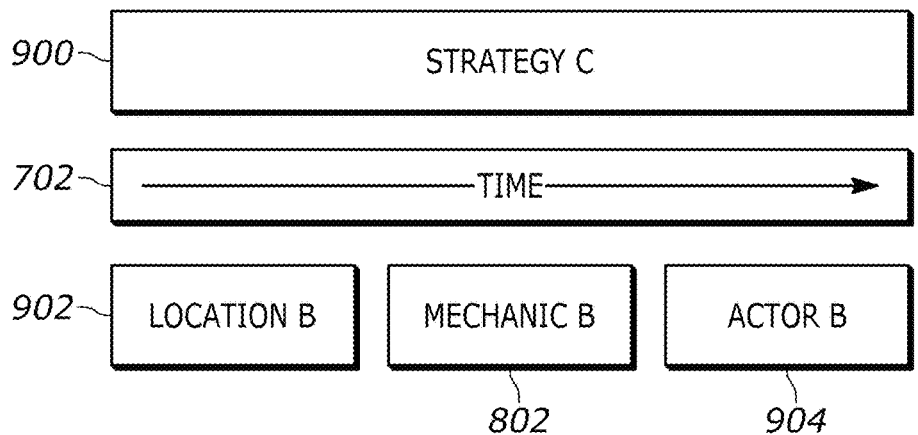

In FIG. 9 a third strategy 900 may have been recorded as having taken place in a second game location 902 than the first and second strategies using the mechanic 802 of the second strategy 800 and a new, different actor or game character 904.

Figure 10:
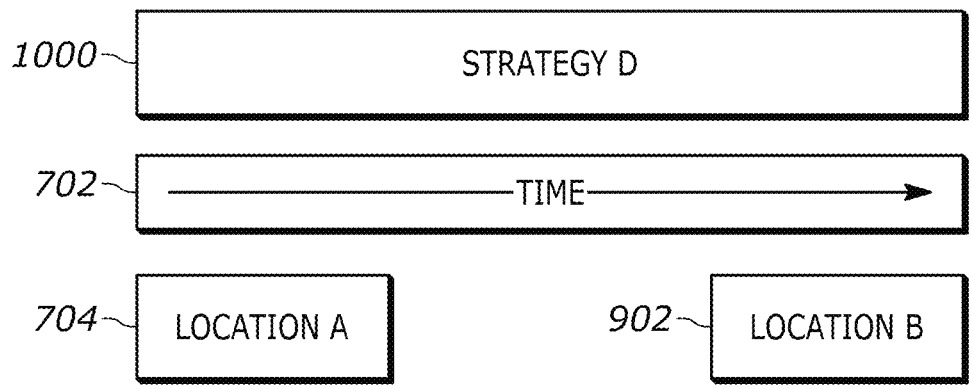
Figure 11:
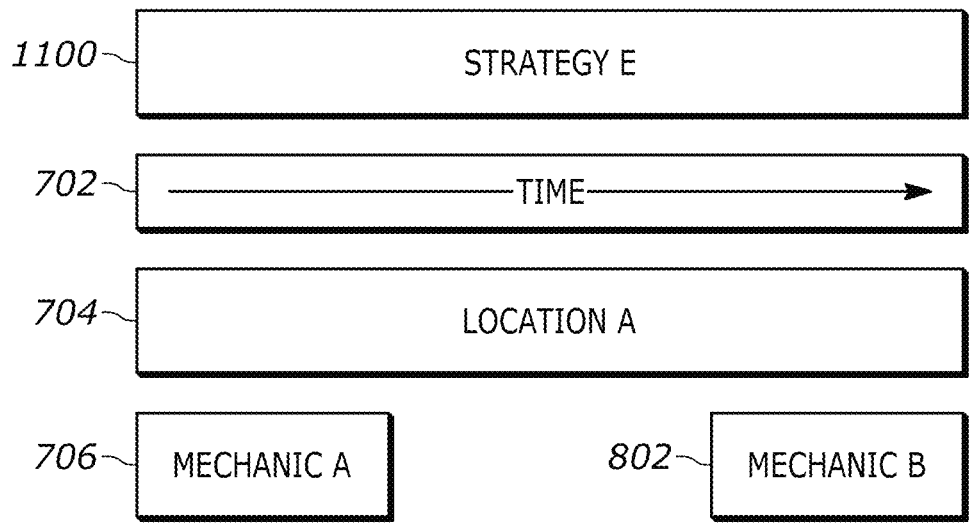

In FIG. 10 a third strategy 1000 may have involved game play in the same game zone or location 704 as the first strategy 700 with action then moving to the second location 902 that was employed in the third strategy 900. FIG. 11 illustrates yet a fifth example strategy 1100 in which game play occurred in the first zone or location 704 as in the first strategy 700 using the first mechanic 706 as was employed in the first strategy 700 and then over time transitioning to use of the second mechanic 802 as employed in the second strategy 800.

FIG. 12 illustrates data flow from, left to right in the figure, actual recorded play data 1200 representing the strategies employed in multiple game plays, including metadata 1202 (game locations over time at which game characters conducted various activities using various mechanics, along with statistics of the game including the difficulty level set and success indicia of the outcome), flowing into the database 208. The ML model 210 accesses the strategies in the database 208 both for training as described above and to return one or more advisories 1204 to a player of a current game.

The advisories 1204 may include, in addition to those examples described elsewhere herein, an indication of what the player currently is doing in terms of character employed, mechanic employed, and location in the game of the activity. The advisories also may include recommendations in terms of what successful gamers are doing playing the same game but using perhaps different characters in different game locations with different mechanics than currently being employed by the player receiving the advice. The player receiving the advice may thus be presented with recommendations for changing one or more of the object types described herein, e.g., to change play using a different game character or different game mechanic or conduct a different activity in a different game location.

While the particular embodiments are herein shown and described in detail, it is to be understood that the subject matter which is encompassed by the present invention is limited only by the claims.

What is claimed is:

1. A system comprising:
   at least one computer medium that is not a transitory signal and that comprises instructions executable by at least one processor to:
   train at least a first machine learning (ML) model on plural computer game strategies, at least some of the strategies comprising at least one computer game character executing at least one activity using at least one mechanic in at least one computer game location, the at least some of the strategies being associated with ground truth outcomes;
   subsequent to training, input to the ML model a current game information;
   use the ML model to output an advisory to a player of a computer game generating the current game information regarding changing one or more of a computer game character, a mechanic, a location, an activity; and
   present the advisory on at least one computer display, wherein presenting the advisory depends on a difficulty level such that a lower difficulty level results in presenting an advisory more often than an advisory is presented for a higher difficulty level.

2. The system of claim 1, comprising the at least one processor.

3. The system of claim 1, wherein the advisory regards changing a computer game character.

4. The system of claim 1, wherein the advisory regards changing a mechanic.

5. The system of claim 1, wherein the advisory regards changing a location.

6. The system of claim 1, wherein the advisory regards changing an activity.

7. The system of claim 1, wherein the instructions are executable to:
   arrange game play historical data in a database according to object types employed in respective computer games, the object types comprising computer game characters, computer game activities, computer game mechanics, computer game locations.

8. The system of claim 1, wherein the mechanic includes a weapon.

9. The system of claim 1, wherein the mechanic includes a vehicle.

10. The system of claim 1, wherein at least some of the strategies comprise statistics as to the outcomes of characters operating mechanics in various zones or locations to execute certain activities.

11. The system of claim 10, wherein the statistics comprise boss kills.

12. The system of claim 10, wherein the statistics comprise survival time.

13. The system of claim 10, wherein the statistics comprise highest game level attained.

14. The system of claim 10, wherein the statistics comprise total enemies killed.

15. The system of claim 10, wherein the statistics comprise how quickly the character died.

16. The system of claim 10, wherein the statistics comprise missed shots.

17. The system of claim 1, wherein the advisory is presented tactilely.

18. The system of claim 1, wherein presenting the difficulty level is set by the player.

19. A system comprising:
   at least one computer medium that is not a transitory signal and that comprises instructions executable by at least one processor to:
   train at least a first machine learning (ML) model on plural computer game strategies, at least some of the strategies comprising at least one computer game character executing at least one activity using at least one mechanic in at least one computer game location, the at least some of the strategies being associated with ground truth outcomes;
   subsequent to training, input to the ML model a current game information;
   use the ML model to output an advisory to a player of a computer game generating the current game information regarding changing one or more of a computer game character, a mechanic, a location, an activity; and
   present the advisory on at least one computer display wherein presenting the advisory depends on a difficulty level such that a lower difficulty level results in presenting an advisory or earlier in a game than an advisory is presented for a higher difficulty level.

20. The system of claim 19, wherein the difficulty level is set by the player.

* * * * *